United States Patent [19]

Mazzaccaro

[11] Patent Number: 6,112,650
[45] Date of Patent: Sep. 5, 2000

[54] CAN DRAINING DEVICE

[76] Inventor: Jeffrey A. Mazzaccaro, 134 Dugan La., Toms River, N.J. 08753

[21] Appl. No.: 09/264,018

[22] Filed: Mar. 8, 1999

[51] Int. Cl.[7] ........................................... B30B 9/06
[52] U.S. Cl. .................................. 100/110; 100/116
[58] Field of Search ................... D7/666; D8/52; 81/420, 418; 100/110, 116, 234, 283; 269/6

[56] References Cited

U.S. PATENT DOCUMENTS

| | | | |
|---|---|---|---|
| 4,355,574 | 10/1982 | Bond et al. | 100/234 |
| 5,143,359 | 9/1992 | Bush | 269/6 |
| 5,295,432 | 3/1994 | Keville et al. | 100/110 |
| 5,335,591 | 8/1994 | Pozar | 100/116 |
| 5,590,590 | 1/1997 | Zammit | 99/495 |
| 5,706,721 | 1/1998 | Homes | 99/495 |

*Primary Examiner*—Peter Vo
*Assistant Examiner*—Louis G. Huynh
*Attorney, Agent, or Firm*—Henderson & Sturm LLP

[57] ABSTRACT

A can draining device 10 for separating the solid and liquid contents of a can 100 by applying a downward force on the severed lid 101 of the can 100 wherein the device 10 includes an upper lever unit 11" pivotally secured to a lower lever unit 11' wherein both lever units are provided with lever arm members 20, 30 provided on one end with rearwardly projecting handle members 24, 34 and further provided on their other ends with pivoted jaw members 40; wherein the jaw members 40 allow the captively engaged can 100 and severed lid 101 to be pivoted relative to the handle members 24, 34 to facilitate the draining of liquid from within the can 100.

4 Claims, 1 Drawing Sheet

CAN DRAINING DEVICE

BACKGROUND OF THE INVENTION

1. Field of the Invention

The present invention relates to the field of can pressing devices in general and in particular to a double pivoted jaw arrangement for a can pressing device.

2. Description of Related Art

As can be seen by reference to the following U.S. Pat. Nos., 5,590,590; 4,355,574; 5,295,432; 5,335,591; and 5,706,721 the prior art is replete with myriad and diverse can pressing or draining devices.

While all of the aforementioned prior art constructions are more than adequate for the basic purpose and function for which they have been specifically designed, they are uniformly deficient with respect to their failure to provide a simple, efficient, and practical arrangement for a can pressing device that will allow the can to be pivoted relative to the handles of the device while the can is captively engaged between the jaws of the device.

As anyone who has used the prior art can draining devices is all too well aware, as the contents of the can are being drained, it is usually necessary to manipulate the device into awkward positions to insure that the liquid contents of the can will flow in a desired direction.

As a consequence of the foregoing situation, there has existed a longstanding need for a new and improved type of draining device that employs a novel arrangement allowing the can to be captively engaged by the jaws of the device while still permitting the pivotal rotation of the can; and, the provision of such a construction is the stated objective of the present invention.

BRIEF SUMMARY OF THE INVENTION

Briefly stated, the can draining device of this invention comprises a pair of lever units which are pivotally connected to a jaw member such that a can and lid can be pivotally suspended between the lever units during the draining process and further including a biasing unit for biasing the jaw members in a direction apart from one another.

As will be explained in greater detail further on in the specification, each of the lever units include a lever arm member having a jaw member pivotally secured on one end wherein the other end of the lever arm members are provided with handle members which are biased in a direction apart from one another by the biasing unit.

In the operation of the device, a user would place a can with a severed lid between the jaw members and then grasp the handle members to force the jaw members towards one another. Once external pressure is applied on the handle members, the jaw members are forced together against the force of the biasing unit to force the liquid from the can, while the pivoted mounting arrangement of the jaw members allows the captively engaged can and severed lid to be pivoted relative to the handle members to facilitate the draining of the liquid from within the contents of the can.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figures 1, 2, 3:
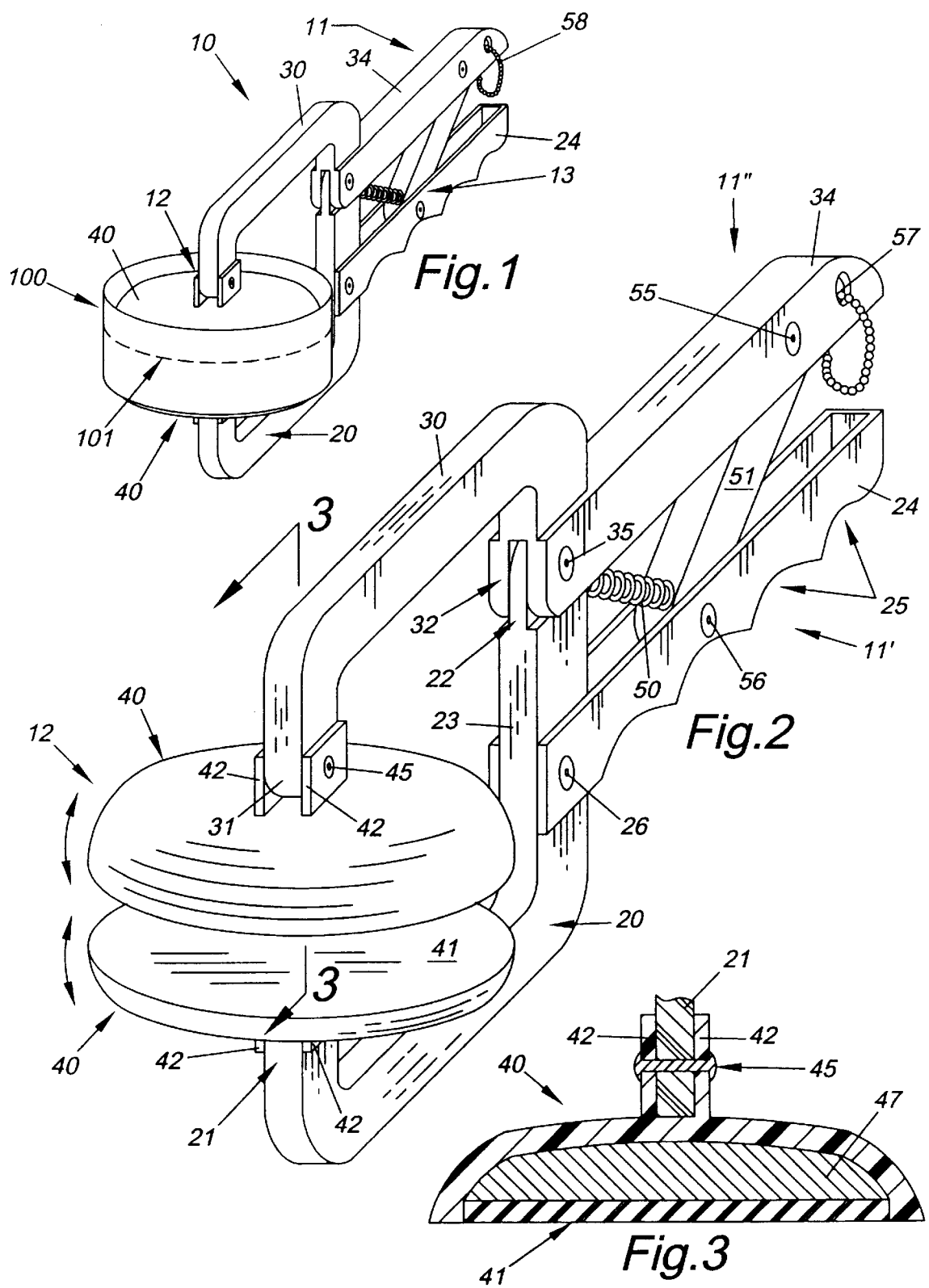
FIG. 1 is a perspective view of the can draining device of this invention operatively engaged with an open can.
FIG. 2 is an isolated perspective view of the can draining device.
FIG. 3 is a cross-sectional view of one of the jaw members of the device taken through line 3—3 of FIG. 2.

As can be seen by reference to the drawings, and in particular to FIG. 1, the can draining device that forms the basis of the present invention is designated generally by the reference number 10. The can draining device 10 is specifically designed for use with a can 100 containing both solid and liquid contents wherein the can 100 has been opened such that the can lid 101 rests on top of the contents in a well recognized fashion. The device 10 comprises, in general, a pair of lever units 11 wherein each lever unit 11 is provided with a jaw unit 12 and a biasing unit 13 for normally separating the lever units 11. These units will now be described in seriatim fashion.

As shown in FIG. 2, the lever units 11 comprise a stationary lower lever unit 11' and a movable upper lever unit 11". The lower lever unit 11' comprises a generally J-shaped lower lever arm member 20 having a proximal upper end 21 and a distal lower end 22 wherein the stem portion 23 of the J-shaped lever arm member 20 is provided with a rearwardly extending lower hollow handle member 24 which is pivotally connected to the stem portion 23 as at 26, wherein the lower portion of the hollow handle element 24 is further provided with a plurality of finger grip recesses 25.

In addition, the upper lever unit 11" comprises a generally C-shaped upper lever arm member 30 having a distal end 31 and a proximal end 32; wherein, the proximal end 32 is provided with a rigidly attached rearwardly extending upper hollow handle member 34 and is further pivotally connected as at 35 to the upper end 21 of the lower lever arm member 20.

Turning now to FIGS. 2 and 3, it can be seen that the jaw unit 12 comprises a pair of mirror image generally disk shaped jaw member 40 having a generally flat circular jaw surface 41 formed on their outboard ends and a pair of ear elements 42 which project outwardly from their inboard ends; wherein, the ear elements 42 are pivotally secured as at 45 to the distal ends 21 and 31 respectively of the lower 20 and upper 30 lever arm members.

As can best be seen by reference to FIG. 3, this invention further contemplates that at least the jaw member 40 on the upper lever arm member 30 will be provided with a magnetic element 47 that will attract the metal lid 101 of the can 100 to remove the lid 101 from the can 100 when the draining process is complete; and, in most instances, both of the mirror image jaw members 40 will be provided with magnetic element 47 such that both the can 100 and the lid 101 will be magnetically attracted to the flat jaw surfaces 41 that they come into direct contact with.

Turning now to FIGS. 1 and 2, it can be seen that the biasing unit 13 comprises a spring member 50 disposed between the upper 34 arm member; and an angled linkage arm 51 which is pivotally secured on the upper end as at 55 proximate the outer end of the upper handle member 34 and pivotally connected on the lower end as at 56 at the intermediate portion of the lower handle member 24 wherein the spring member 50 and the linkage arm 51 will cooperate with one another to normally force the lower lever arm member 20 downwardly and rearwardly relative to the upper lever arm member 30 and to force the outer ends of the handle members 24, 34 in a direction apart from one another.

By now, it should be appreciated that the user would employ the device 10 by placing a can 100 having a severed lid 101 on the lower jaw member 40 while the upper 30 and lower 20 lever arm members are spaced widely apart.

Once pressure is applied on the handle members 24, 34 the jaws 40 will be forced towards one another to force the liquid contents of the can 100 around the lid 101 for the purposes of draining the can. Furthermore, the dual pivoted jaw arrangement permits the can 100 and lid to be pivoted relative to the lever arm members 20 and 30 to facilitate the draining process without undue manipulation of the handle members 24, 34.

In addition, as shown in FIG. 2, this invention also contemplates the provision of an aperture 57 formed in one of the handle members 24, 34 wherein the aperture 57 is dimensioned to receive a chain loop 58 that can force the handle members 24, 34 towards one another against the influence of the spring member 50 so that the device 10 will assume the position depicted in FIG. 2 for storage purposes.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A can draining device for use with a can having a severed can lid to allow the liquid contents of a can to pass around the severed lid of the can wherein the device comprises:

a pair of lever units including a lower lever unit and an upper lever unit pivotally connected to the lower unit wherein both of the lever units include a lever arm member having an outboard end and an inboard end wherein the inboard end of the lever arm members are provided with rearwardly projecting handle members; and a jaw unit including a pair of jaw members; wherein each jaw member is pivotally associated with the outboard end of one of the lever arm members; wherein both of the jaw members are provided with magnetic elements for captively engaging both the can and the severed can lid; whereby, the can and severed can lid can be pivoted relative to pair of lever units as the jaw members force the severed can lid toward the bottom of the can.

2. The device as claim 1 wherein said lower lever unit comprises:

a generally J-shaped lower lever arm member having a stem portion and a lower distal end pivotally connected to one of the jaw members, and an upper proximal end; wherein the stem portion of the J-shaped lower lever arm member has a hollow lower handle member extending rearwardly therefrom and pivotally connected thereto.

3. The device as in claim 2; further including: an angled linkage arm pivotally connected on one end to the lower handle member and pivotally connected on the other end to the upper handle member.

4. The device as in claim 3; wherein the linkage arm is pivotally connected to the lower handle member and pivotally connected to one end of the upper handle member.

\* \* \* \* \*